United States Patent

Corrigan et al.

[11] Patent Number: 5,861,225
[45] Date of Patent: Jan. 19, 1999

[54] NICKEL BATTERY ELECTRODE HAVING MULTIPLE COMPOSITION NICKEL HYDROXIDE ACTIVE MATERIALS

[75] Inventors: Dennis Corrigan; Cristian Fierro, both of Troy; Franklin J. Martin, Rochester Hills; Stanford R. Ovshinsky, Bloomfield Hills; Liwei Xu, Troy, all of Mich.

[73] Assignee: Ovonic Battery Company, Inc., Troy, Mich.

[21] Appl. No.: 506,058

[22] Filed: Jul. 24, 1995

Related U.S. Application Data

[63] Continuation-in-part of Ser. No. 300,610, Sep. 2, 1994, Pat. No. 5,569,563, and Ser. No. 308,764, Sep. 19, 1994, Pat. No. 5,567,549, each is a continuation-in-part of Ser. No.27,973, Mar. 8, 1993, Pat. No. 5,348,822, which is a continuation-in-part of Ser. No. 975,031, Nov. 12, 1992, Pat. No. 5,344,728.

[51] Int. Cl.$^6$ .............................. H01M 4/32; H01M 4/52; H01M 4/28
[52] U.S. Cl. .............................. 429/223; 205/57; 205/60; 429/128
[58] Field of Search ..................... 429/223, 128; 205/57, 60; 204/290 R

[56] References Cited

U.S. PATENT DOCUMENTS

| | | | |
|---|---|---|---|
| 3,959,014 | 5/1976 | Bauer et al. | 136/29 |
| 4,337,124 | 6/1982 | Maskalick | 205/60 |
| 4,347,429 | 8/1982 | Will | 429/223 |
| 4,399,005 | 8/1983 | Fritts et al. | 205/60 |
| 4,536,259 | 8/1985 | Oda et al. | 204/35.1 |
| 5,079,110 | 1/1992 | Nakahori et al. | 429/223 |

*Primary Examiner*—Prince Willis, Jr.
*Assistant Examiner*—Carol Chaney
*Attorney, Agent, or Firm*—David W. Schumaker; Marvin S. Siskind; Marc J. Luddy

[57] ABSTRACT

A high capacity long cycle life positive electrode which includes an electronically conductive substrate for conducting electricity through the electrode and an electrochemically active nickel hydroxide material in electrical contact with the electronically conductive substrate, the electrochemically active nickel hydroxide material is composed of at least two different solid solution nickel hydroxide materials each having differing compositions. The positioning of the at least two different solid solution nickel hydroxide materials and their relative compositions alter the local redox potential or porosity to force discharge of the electrode in a stepwise fashion from the nickel hydroxide material remote from said conductive network or substrate, through any intermediate nickel hydroxide materials, to the nickel hydroxide material adjacent the conductive network or substrate.

25 Claims, 2 Drawing Sheets

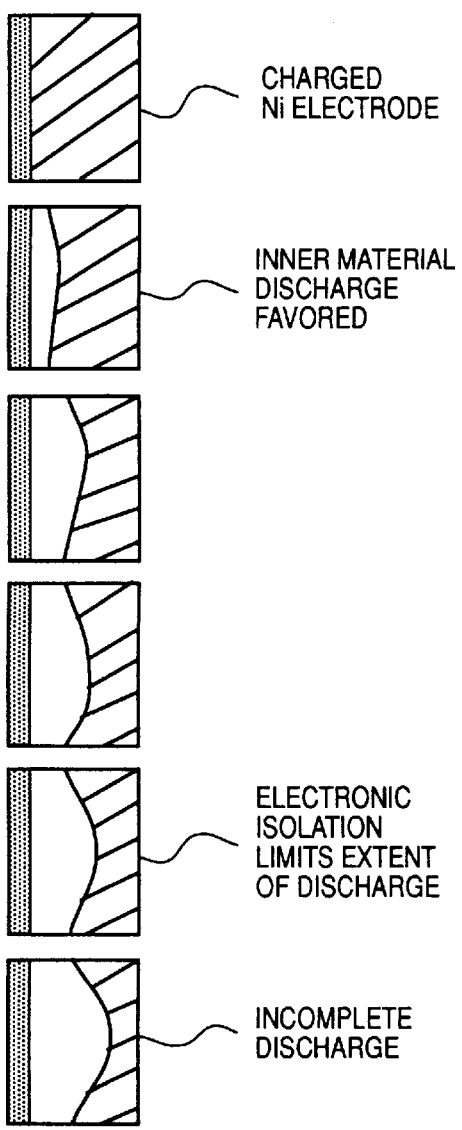
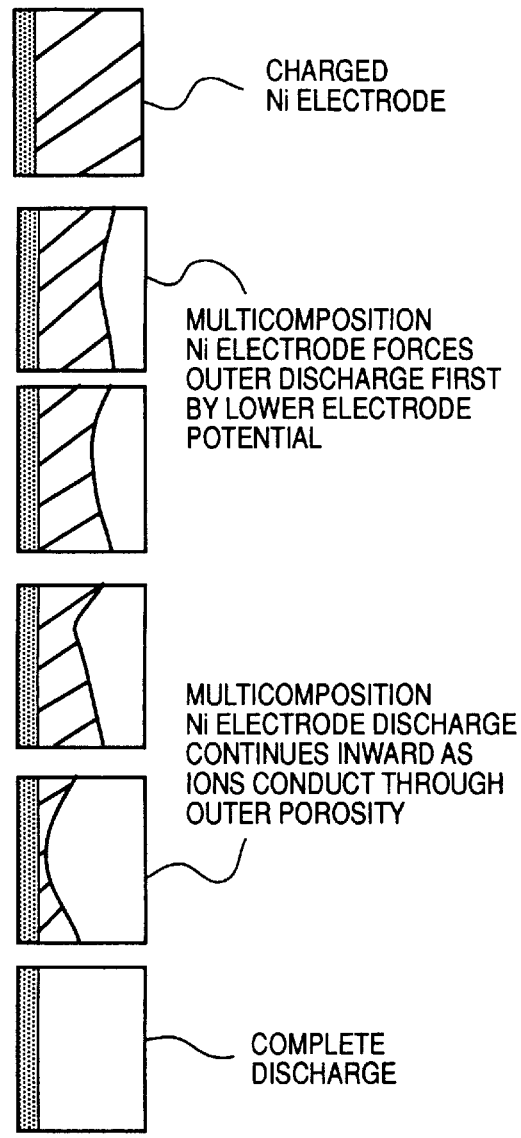
FIG - 1
FIG - 2
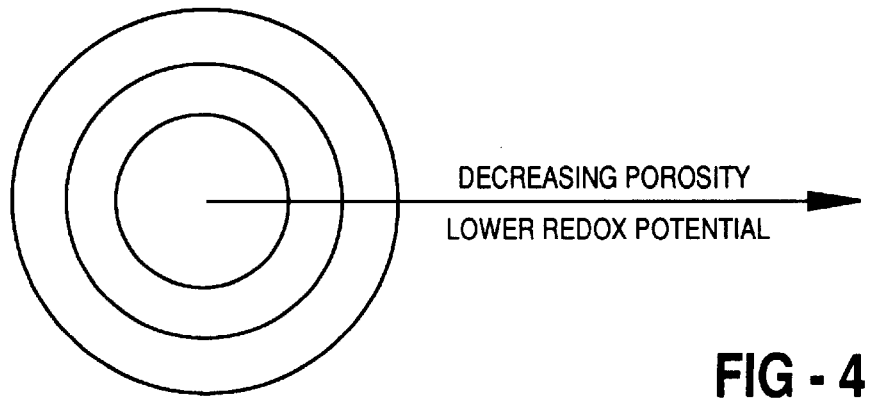
FIG - 4

NICKEL BATTERY ELECTRODE HAVING MULTIPLE COMPOSITION NICKEL HYDROXIDE ACTIVE MATERIALS

CONTINUING APPLICATION INFORMATION

This application is a continuation-in-part of U.S. patent application Ser. No. 08/300,610, filed Sep. 2, 1994, now U.S. Pat. No. 5,569,563 and U.S. patent application Ser. No. 08/308,764 filed Sep. 19, 1994, now U.S. Pat. No. 5,567,549 both of which are, in turn, continuations-in-part of U.S. patent application Ser. No. 08/027,973 filed Mar. 8, 1993, now U.S. Pat. No. 5,348,822 which was, in turn, a continuation-in-part of U.S. patent application Ser. No. 07/975,031, filed Nov. 12, 1992, now U.S. Pat. No. 5,344,728.

FIELD OF THE INVENTION

The present invention relates generally to an optimized nickel hydroxide positive electrode for alkaline rechargeable batteries. More specifically, the invention relates to an electrode comprising a conducting substrate and two or more compositionally distinct nickel hydroxide materials differing in chemical additive content in such a way as to increase the electrochemical capacity of the electrode as compared with electrodes containing only a uniform composition of nickel hydroxide material. The nickel hydroxide materials in the inventive electrodes exhibit multiple electron transfer.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells are used in numerous consumer devices such as calculators, portable radios, and cellular phones. They are often configured into a sealed power pack that is designed as an integral part of a specific device. Rechargeable alkaline cells can also be configured as larger cells that can be used, for example, in industrial, aerospace, and electric vehicle applications.

There are many known types of Ni based cells such as nickel cadmium ("NiCd"), nickel metal hydride ("Ni—MH"), nickel hydrogen, nickel zinc, and nickel iron cells. NiCd rechargeable alkaline cells are the most widely used although it appears that they will be replaced by Ni—MH cells. Compared to NiCd cells, Ni—MH cells made of synthetically engineered materials have superior performance parameters and contain no toxic elements.

Stanford R. Ovshinsky, by applying his fundamental principles of disorder, pioneered the development of the first commercial nickel metal hydride (NiMH) battery. For more than three decades, virtually every other manufacturer in the world studied the NiMH battery technology, but no commercial battery of this kind existed until after the publication of U.S. Pat. No. 4,623,597 to Ovshinsky and Ovshinsky's related technical papers which disclosed basic and fundamentally new principles of battery material design. NiMH batteries are the only truly "green" battery because they can be completely recycled. NiMH batteries are the only rechargeable battery that can meet society's requirements for an ecological, renewable source of electrochemical energy.

Ni—MH cells utilize a negative electrode that is capable of the reversible electrochemical storage of hydrogen. Ni—MH cells usually employ a positive electrode of nickel hydroxide material. The negative and positive electrodes are spaced apart in the alkaline electrolyte. Upon application of an electrical potential across a Ni—MH cell, the Ni—MH material of the negative electrode is charged by the electrochemical absorption of hydrogen and the electrochemical discharge of a hydroxyl ion, as shown in equation (1):

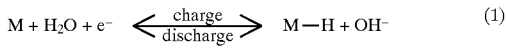

$$M + H_2O + e^- \underset{\text{discharge}}{\overset{\text{charge}}{\rightleftarrows}} M-H + OH^- \quad (1)$$

The negative electrode reactions are reversible. Upon discharge, the stored hydrogen is released to form a water molecule and release an electron. The reactions that take place at the nickel hydroxide positive electrode of a Ni—MH cell are shown in equation (2):

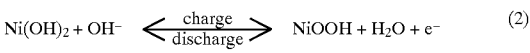

$$Ni(OH)_2 + OH^- \underset{\text{discharge}}{\overset{\text{charge}}{\rightleftarrows}} NiOOH + H_2O + e^- \quad (2)$$

Ni—MH materials are discussed in detail in U.S. Pat. No. 5,277,999 to Ovshinsky, et al., the contents of which are incorporated by reference.

As previously mentioned, Stanford R. Ovshinsky was responsible for inventing new and fundamentally different electrochemical electrode materials. As predicted by Ovshinsky, detailed investigation by Ovshinsky's team determined that reliance on simple, relatively pure compounds was a major shortcoming of the prior art. Relatively pure crystalline compounds were found to have a low density of hydrogen storage sites, and the type of sites available occurred accidently and were not designed into the bulk of the material. Thus, the efficiency of the storage of hydrogen and the subsequent release of hydrogen to form water was determined to be poor. By applying his fundamental principles of disorder to electrochemical hydrogen storage, Ovshinsky drastically departed from conventional scientific thinking and created a disordered material having an ordered local environment where the entire bulk of the material was provided with catalytically active hydrogen storage sites.

Short-range, or local, order is elaborated on in U.S. Pat. No. 4,520,039 to Ovshinsky, entitled *Compositionally Varied Materials and Method for Synthesizing the Materials*, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment and/or orbital overlap plays a significant role physically, electronically, or chemically so as to affect physical properties and hence the functions of the materials. Ovshinsky's use of disordered materials has fundamental scientific advantages. The elements of these materials offer a variety of bonding possibilities due to the multidirectionality of d-orbitals. The multidirectionality ("porcupine effect") of d-orbitals provides for a tremendous increase in density and hence active storage sites. These techniques result in means of synthesizing new materials which are disordered in several different senses simultaneously.

Ovshinsky had previously found that the number of surface sites could be significantly increased by making an amorphous film that resembled the surface of the desired relatively pure materials. As Ovshinsky explained in *Principles and Applications of Amorphicity, Structural Change, and Optical Information Encoding,* 42 *Journal De Physique* at C4-1096 (Octobre 1981):

Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials. . . .

Once amorphicity was understood as a means of introducing surface sites in a film, it was possible to produce "disorder" that takes into account the entire spectrum of local order effects such as porosity, topology, crystallites, characteristics of sites, and distances between sites. Thus, rather than searching for material modifications that would yield ordered materials having a maximum number of accidently occurring surface irregularities, Ovshinky's team at ECD began constructing "disordered" materials where the desired irregularities were tailor made. See, U.S. Pat. No. 4,623,597, the disclosure of which is incorporated by reference.

The term "disordered," as used herein corresponds to the meaning of the term as used in the literature, such as the following:

A disordered semiconductor can exist in several structural states. This structural factor constitutes a new variable with which the physical properties of the [material] . . . can be controlled. Furthermore, structural disorder opens up the possibility to prepare in a metastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements . . . .

S. R. Ovshinsky, *The Shape of Disorder,* 32 *Journal of Non-Crystalline Solids* at 22 (1979) (emphasis added).

The "short-range order" of these disordered materials are further explained by Ovshinsky in *The Chemical Basis of Amorphicity: Structure and Function,* 26:8–9 *Rev. Roum. Phys.* at 893–903 (1981):

[S]hort-range order is not conserved . . . . Indeed, when crystalline symmetry is destroyed, it becomes impossible to retain the same short-range order. The reason for this is that the short-range order is controlled by the force fields of the electron orbitals therefore the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . .

Short-range, or local, order is elaborated on in U.S. Pat. No. 4,520,039 to Ovshinsky, entitled *Compositionally Varied Materials and Method for Synthesizing the Materials,* the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment plays a significant role physically, electrically, or chemically so as to affect the physical properties and hence the functions of the materials. These techniques result in means of synthesizing new materials which are disordered in several different senses simultaneously.

By forming metal hydride alloys from such disordered materials, Ovshinsky and his team were able to greatly increase the reversible hydrogen storage characteristics required for efficient and economical battery applications, and produce, for the first time, commercially viable batteries having high density energy storage, efficient reversibility, high electrical efficiency, bulk hydrogen storage without structural change or poisoning, long cycle life, and deep discharge capability.

The improved characteristics of these alloys result from tailoring the local chemical order and hence the local structural order by the incorporation of selected modifier elements into a host matrix. Disordered metal hydride alloys have a substantially increased density of catalytically active sites and storage sites compared to conventional ordered materials. These additional sites are responsible for improved efficiency of electrochemical charging/discharging and an increase in electrical energy storage capacity. The nature and number of storage sites can even be designed independently of the catalytically active sites. More specifically, these disordered multi-component alloys are thermodynamically tailored to allow storage of hydrogen atoms at a wide range of modulated bonding strengths within the range of reversibility suitable for use in secondary battery applications.

Based on these principles of disordered materials, described above, a family of extremely efficient electrochemical hydrogen storage materials were formulated. These are the Ti—V—Zr—Ni type active materials such as disclosed by Ovshinsky's team in U.S. Pat. No. 4,551,400 ("the '400 Patent"), the disclosure of which is incorporated by reference. These materials reversibly form hydrides in order to store hydrogen. All the materials used in the '400 Patent utilize a Ti—V—Ni composition, where at least Ti, V, and Ni are present with at least one or more of Cr, Zr, and Al. The materials of the '400 Patent are generally multiphase polycrystalline materials, which may contain, but are not limited to, one or more phases of Ti—V—Zr—Ni material with $C_{14}$ and $C_{15}$ type crystal structures. Other Ti—V—Zr—Ni alloys may also be used for fabricating rechargeable hydrogen storage negative electrodes. One such family of materials are those described in U.S. Pat. No. 4,728,586 ("the '586 Patent"), titled *Enhanced Charge Retention Electrochemical Hydrogen Storage Alloys and an Enhanced Charge Retention Electrochemical Cell*, the disclosure of which is incorporated by reference.

The characteristic surface roughness of the metal electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. The microscopic chemical, physical, and crystallographic parameters of the individual phases within the hydrogen storage alloy material are believed to be important in determining its macroscopic electrochemical characteristics.

In addition to the physical nature of its roughened surface, it has been observed that V—Ti—Zr—Ni alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component—the metallic nickel—appears to interact with chromium alloys in catalyzing various hydride and dehydride reaction steps. To a large extent, many electrode processes, including competing electrode processes, are controlled by the presence of chromium in the hydrogen storage alloy material, as disclosed in the '586 Patent.

In alkaline rechargeable cells, the discharge capacity of a nickel based positive electrode is limited by the amount of active material, and the charging efficiencies. The charge capacities of a Cd negative electrode and a MH negative electrode are both provided in excess, to maintain the optimum capacity and provide overcharge protection. Thus, a goal in making the nickel positive electrode is to obtain as high an energy density as possible. The volume of a nickel hydroxide positive electrode is sometimes more important than weight. The volumetric capacity density is usually measured in mAh/cc and specific capacity is written as mAh/g.

At present, sintered or pasted nickel hydroxide positive electrodes are used in NiCd and Ni—MH cells. The process of making sintered electrodes is well known in the art. Conventional sintered electrodes normally have an energy density of around 480–500 mAh/cc. In order to achieve significantly higher loading, the current trend has been away from sintered positive electrodes and toward foamed and pasted electrodes.

Sintered nickel electrodes have been the dominant nickel electrode technology for several decades for most applications. These consist of a porous nickel plaque of sintered high surface area nickel particles impregnated with nickel hydroxide active material either by chemical or electrochemical methods. While expensive, sintered electrodes provide high power, high reliability, and high cycle life, but not the highest energy density. They are likely to remain important for high reliability military and aerospace applications for some time.

Pasted nickel electrodes consist of nickel hydroxide particles in contact with a conductive network or susbtrate, preferably having a high surface area. There have been several varrients of these electrodes including the so-called plastic-bonded nickel electrodes which utilize graphite as a microconductor and also including the so-called foam-metal electrodes which utilize high porosity nickel foam as a substrate loaded with spherical nickel hydroxide particles and cobalt conductivity enhancing additives. Pasted electrodes of the foam-metal type have started to penetrate the consumer market due to their low cost and higher energy density relative to sintered nickel electrodes.

Conventionally, the nickel battery electrode reaction has been considered to be a one electron process involving oxidation of divalent nickel hydroxide to trivalent nickel oxyhydroxide on charge and subsequent discharge of trivalent nickel oxyhydroxide to divalent nickel hydroxide, as shown in equation 2 hereinbelow.

Some recent evidence suggests that quadrivalent nickel is involved in the nickel hydroxide redox reaction. This is not a new concept. In fact, the existence of quadrivalent nickel was first proposed by Thomas Edison in some of his early battery patents. However, full utilization of quadrivalent nickel has never been investigated.

In practice, electrode capacity beyond the one-electron transfer theoretical capacity is not usually observed. One reason for this is incomplete utilization of the active material due to electronic isolation of oxidized material. Because reduced nickel hydroxide material has a high electronic resistance, the reduction of nickel hydroxide adjacent the current collector forms a less conductive surface that interferes with the subsequent reduction of oxidized active material that is farther away.

Ovshinsky and his team have developed positive electrode materials that have demonstrated reliable transfer of more than one electron per nickel atom. Such materials are described in U.S. Pat. Nos. 5,344,728 and 5,348,822 (which describe stabilized disordered positive electrode materials) and copending U.S. patent application Ser. No. 08/300,610 filed Aug. 23, 1994, and U.S. patent application Ser. No. 08/308,764 filed Sep. 19, 1994.

SUMMARY OF THE INVENTION

One objective of the present invention is a nickel hydroxide positive electrode with improved capacity and lowered cost. Another objective of this invention is a nickel hydroxide electrode resistant to swelling. Still another objective is a nickel hydroxide electrode capable maintaining improved capacity throughout its cycle life while operating over a wide temperature range.

These and other objectives of the invention are satisfied by the high capacity, long cycle life positive electrode of the instant invention. The electrode includes an electronically conductive substrate for conducting electricity through the electrode and an electrochemically active nickel hydroxide material in electrical contact with the electronically conductive substrate, the electrochemically active nickel hydroxide material is composed of at least two different solid solution nickel hydroxide materials each having differing compositions. The positioning of the at least two different solid solution nickel hydroxide materials and their relative compositions alter the local redox potential or porosity to force discharge of the electrode in a stepwise fashion from the nickel hydroxide material remote from said conductive network or substrate, through any intermediate nickel hydroxide materials, to the nickel hydroxide material adjacent the conductive network or substrate.

More specifically the positive electrode of the instant invention includes a conductive substrate and two or more compositionally distinct nickel hydroxide materials each having differing amounts of chemical additive content, such that the electrochemical capacity of the nickel battery electrode is increased over electrodes which contain a uniform composition of nickel hydroxide material. Embodiments of this invention include thin film nickel hydroxide electrodes with layers of nickel hydroxide active material differing in additive content, sintered nickel hydroxide electrodes with stepwise impregnation of compositionally distinct nickel hydroxide materials, and pasted nickel hydroxide electrodes containing particles of nickel hydroxide with regions of compositionally distinct nickel hydroxide materials.

In one prefered embodiment, the different solid solution nickel hydroxide materials are disposed in discrete detectable layers of differing composition, that are positioned within the electrode such that a first solid solution nickel hydroxide materials is positioned predominantly adjacent to the conductive substrate, a second solid solution nickel hydroxide materials, having a higher redox potential and/or porosity than the first nickel hydroxide material, is positioned predominantly adjacent the first nickel hydroxide material, yet remote from the conductive substrate, and each succeeding nickel hydroxide materials, if any, has a higher redox potential and/or porosity than the preceding material and is positioned adjacent the preceding material, yet remote from all other preceding materials and the conductive substrate.

Each of the different solid solution nickel hydroxide materials may contain all of the same elements as the others and yet contain different percentages of these elements or, on the other hand, one or more of the solid solution nickel hydroxide materials may contain at least one chemical modifier element not present in the other materials. Chemical modifiers such as cobalt, manganese, and silver shift the redox potential and consequently the discharge potential in the cathodic direction, that is to less positive potentials. Chemical modifiers such as cadmium, cerium, chromium, copper, iron, lanthanum, lead, yttrium, and zinc shift the redox potential and consequently the discharge potential in the anodic direction, that is to more positive potentials. Chemical modifiers such as zinc, aluminum, and magnesium with appreciable solubility in basic solutions provide for increased porosity. The chemical modifier element may be selected from the group consisting of Al, Ba, Ca, Co, Cr, Cu, Fe, K, Li, Mg, Mn, Na, Sr, Cd, Ce, La, Pb, Y, Sc, Ag, Sn and Zn.

Some particularly useful combinations of nickel hydroxide materials include:

1) a first solid solution nickel hydroxide material including 5–15 at. % Co as the chemical modifier element and a second solid solution nickel hydroxide material including 0–15 at. % Zn as the chemical modifier element;

2) a first solid solution nickel hydroxide material including 5–15 at. % Mn as the chemical modifier element and a second solid solution nickel hydroxide material including 0–15 at. % Zn as the chemical modifier element; and 3) a first solid solution nickel hydroxide material including 5–15 at. % Co as the chemical modifier element, a second solid solution nickel hydroxide material including 5–15 at. % Mn as the chemical modifier element and a third solid solution nickel hydroxide material including 0–15 at. % Zn as the chemical modifier element.

Finally, one or more of the solid solution nickel hydroxide material may be a disordered material having at least one structure selected from the group consisting of amorphous, micro-crystalline, polycrystalline lacking long range compositional order, or any combination thereof.

BRIEF DESCRIPTION OF THE DRAWINGS

FIG. 1 shows the electronic isolation of oxidized nickel hydroxide material by reduced nickel hydroxide;

FIG. 2 shows how the layers of nickel hydroxide active material more remote from the current collector can be more fully reduced without an intervening insulating barrier of reduced material;

FIG. 4 depicts a representation of a layered nickel hydroxide particle of the present invention, specifically indicating the differing redox potential and/or porosity of the individual layers.

DETAILED DESCRIPTION OF THE INVENTION

Figure 3:
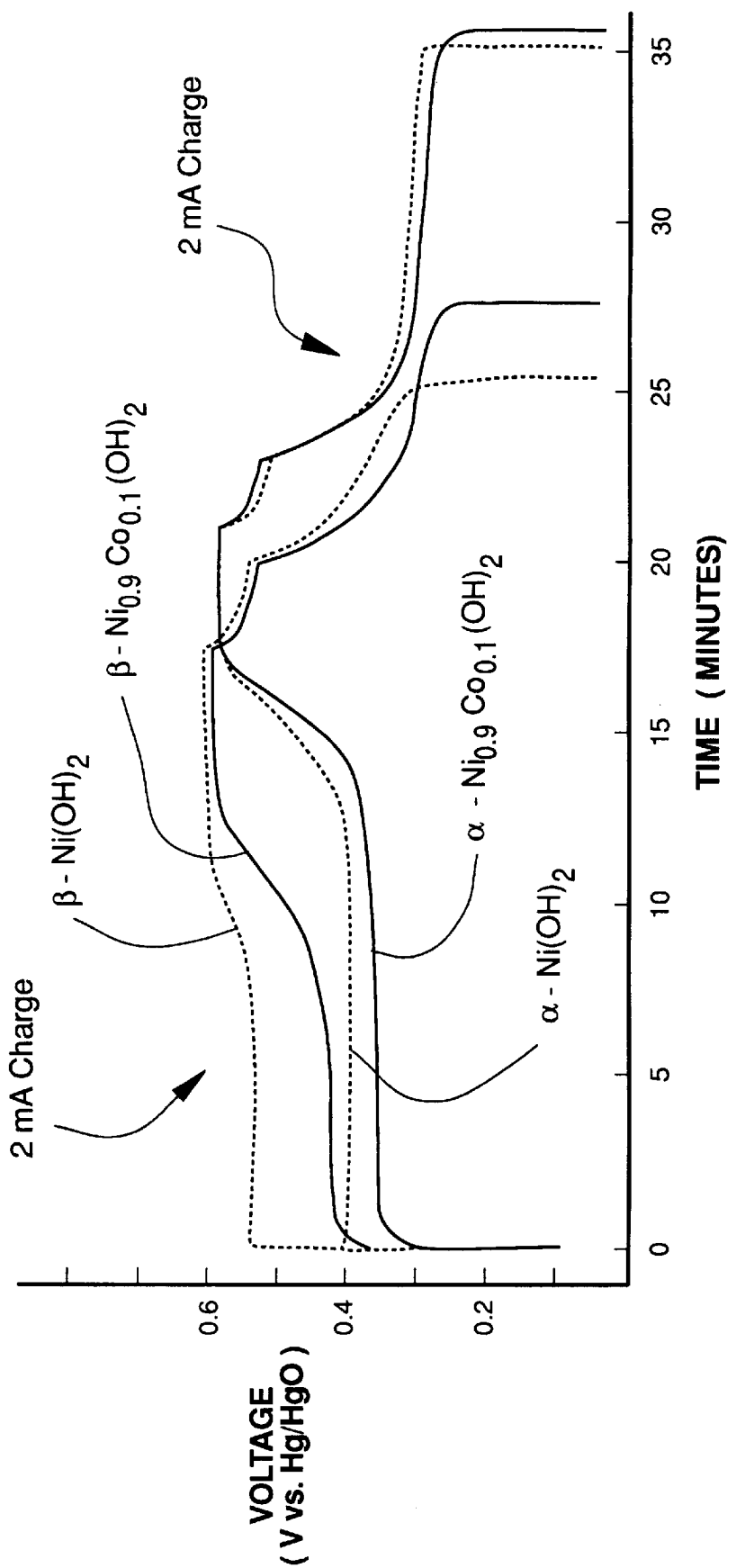
FIG. 3 shows charge-discharge results for thin films of $\alpha$-Ni(OH)$_2$ and $\beta$-Ni(OH)$_2$ with and without 10% coprecipitated cobalt.

The use of quadrivalent nickel positive electrode materials would theoretically double the specific energy of a nickel battery electrode. Because only half the active material would be necessary, this would simultaneously reduce the cost of material. Despite this, there have been few attempts to develop such material for nickel battery electrodes.

Without wishing to be bound by theory, the present inventors believe that the factor that limits the nickel electrode reaction to capacities equivalent to one electron or less is the underutilization of the nickel hydroxide active material. It is believed that underutilization is caused by electronic isolation of oxidized nickel hydroxide material by the formation of highly resistive, dense, reduced nickel hydroxide adjacent to the active material and by poor transport of ions to the inner portions of the electrode which are remote from the electrolyte. This is illustrated in FIG. 1. The present invention, overcomes such electronic isolation and ionic transport limitations through the use of a unique disordered nickel hydroxide material formulated using novel chemical/structural modification techniques.

It should be noted that the term "substrate" as used herein relates to any electronically conductive network, foam, grid, plate or foil made from any materials. That is it includes conventional nickel foils, plates and foams, as well as, carbon networks, fibers or particulate and cobalt oxyhydroxide networks.

In this invention, electronic isolation of the active material is avoided by enhancing the dynamic electronic conductivity of the active material at the interface with the conductive substrate and enhancing the porosity of portions of the nickel hydroxide remote from the current collector. The reduction of nickel hydroxide to the insulating form is delayed at the active material interface by adjusting the redox potential to a level below that of the outer layer or layers. The redox potential for the nickel hydroxide oxidation-reduction reaction can be adjusted by the addition of chemical additives such as cobalt or manganese which lower the potential or zinc which raises the potential. The quantitative effects of cobalt, manganese, zinc, and aluminum on the discharge potentials is given in Table 0.

TABLE 0

| FILM | Discharge Potential (V vs. Hg/HgO) |
| --- | --- |
| $\alpha$-Ni(OH)$_2$ | 0.31 |
| $\alpha$-Ni$_{0.9}$Co$_{0.1}$(OH)$_2$ | 0.29 |
| $\alpha$-Ni$_{0.9}$Mn$_{0.1}$(OH)$_2$ | 0.31 |
| $\alpha$-Ni$_{0.9}$Zn$_{0.1}$(OH)$_2$ | 0.38 |
| $\alpha$-Ni$_{0.9}$Al$_{0.1}$(OH)$_2$ | 0.40 |
| $\beta$-Ni(OH)$_2$ | 0.34 |
| $\beta$-Ni$_{0.9}$Co$_{0.1}$(OH)$_2$ | 0.31 |
| $\beta$-Ni$_{0.9}$Mn$_{0.1}$(OH)$_2$ | 0.33 |
| $\beta$-Ni$_{0.9}$Zn$_{0.1}$(OH)$_2$ | 0.41 |
| $\beta$-Ni$_{0.9}$Al$_{0.1}$(OH)$_2$ | ~0.4 |

With the adjustment of the redox potentials, the layers of nickel hydroxide active material more remote from the current collector can be more fully reduced without an intervening insulating barrier of reduced material as shown in FIG. 2. After reduction of the outer layer or layers, the layer adjacent the current collector is still reduced albeit at a slightly lowered potential. Due to its proximity to the current collector, discharge of the inner layer is more facile. Yet, the inner layer discharge may be slightly impeded due to limitations of ionic transport through the outer layers. Ideally, this is also adjusted by increasing the porosity of the outer layer. This can be done through the use of so-called "subtractive" additives in the nickel hydroxide active material such as zinc or aluminum which can be leached out without ill effects providing increased porosity to the outer layers.

This invention can be applied to all types of nickel battery electrodes including thin film electrodes, sintered nickel electrodes, and pasted nickel electrodes. The application to thin film electrodes is straightforward with a multilayer film such that the redox potential of an inner layer is less than that of an outer layer and/or the porosity of an outer layer exceeds that of an inner layer. Nickel hydroxide layers can be cathodically deposited sequentially from deposition solutions of variable composition. Alternatively, layers can be deposited by immersions in nickel salt solutions with various additives precipitated by subsequent immersions in caustic solutions.

In the sintered electrode embodiment of this invention, compositionally distinct nickel hydroxide materials are incorporated into a sintered nickel plaque substrate. Nickel hydroxide materials in direct contact with the nickel plaque current collector are ideally those with a lower redox potential and/or lower porosity than the nickel hydroxide materials remote from the nickel plaque current collector. Compositionally distinct nickel hydroxide materials can be conveniently incorporated in alternate impregnations by chemical and/or electrochemical methods. The first impregnation will tend to be in direct contact with the nickel plaque current collector. Subsequent impregnations will be increasingly remote from the current collector.

Application of this invention to pasted nickel electrodes is somewhat different. Pasted electrodes are include nickel hydroxide particles which can be spherical or irregular. Electronic current is drawn from the outer surface of these particles which are in contact with a conductive network such as microconductor particles of graphite (as described in U.S. patent application Ser. No. 08/300,610), a conductive network of cobalt oxyhydroxide (as described in U.S. patent application Ser. No. 08/333,457), and/or other conductive networks. Thus, the outer surface or shell of the nickel hydroxide active material particles can preferably be comprised of nickel hydroxide with a lowered redox potential to avoid electronic isolation of inner portions of the particles. Similarly, the inner portions of the nickel hydroxide active material particle can preferably be of enhanced porosity to allow electrolyte penetration into portions of the particle remote from the electrolyte. Thus, in this embodiment of the invention, nickel hydroxide particles comprised of an inner shell of higher porosity and an outer shell of lower redox potential are incorporated into pasted nickel hydroxide electrodes. See FIG. 4. Alternatively, individual compositionally distinct nickel hydroxide particles can be mixed to provide partial benefit from this invention by supplying some ratio of nickel hydroxide with a lower redox potential at the current collector interface thereby preventing complete electronic isolation of the active material during discharge.

EXAMPLE I

Bilayer Films With Cobalt Additives

Films of $\alpha$-Ni(OH)$_2$ were deposited onto inert Au foils (1.2×1.4 cm) from a 0.1M nickel nitrate solution with or without 10% cobalt nitrate. Deposition was at 20 mA (6 mA/cm$^2$) for 100 seconds to yielded films about 1 micron thick. Bilayer films were formed by deposition from one solution at 20 mA for 50 seconds followed by deposition from a second solution at 20 mA for 50 seconds.

Films of $\beta$-Ni(OH)$_2$ were prepared by hydrothermal conversion of $\alpha$-Ni(OH)$_2$ films. This involved submerging $\alpha$-Ni(OH)$_2$ films, prepared as described above, for one hour in 0.01M KOH heated to 95° C. Conversion to $\beta$-phase was confirmed by XRD and by electrochemical behavior in cyclic voltammetry measurements.

For electrochemical measurement of the charge-discharge capacity, the gold electrode was positioned at the center of a rectangular plexiglass cell having nickel foil counter electrodes. The test cell contained 9 ml of 30 w/o KOH with 1.5 w/o LiOH. The reference electrode was Hg/HgO. The film on the gold electrode was charged at 2 mA beyond the point at which oxygen evolution occurred. The film was then discharged at 2 mA to 0 V vs. Hg/HgO which takes about 10 minutes.

Films were analyzed for Ni and Co content by atomic absorption (AA) measurements. A theoretical discharge capacity was obtained from the total nickel and cobalt content and the number of electrons per metal atom was calculated. (It is generally known that cobalt does not participate in the charge-discharge process. However, this approach includes the contribution of cobalt to the weight of the film and allows for direct comparison of the specific capacities of the active materials.)

Nickel battery electrodes may be comprised of $\alpha$-Ni(OH)$_2$ and $\beta$-Ni(OH)$_2$ and other phases. Charge-discharge results for thin films of $\alpha$-Ni(OH)$_2$ and $\beta$-Ni(OH)$_2$ with and without 10% coprecipitated cobalt are shown in FIG. 3. Greater discharge capacities were observed with α-Ni(OH)$_2$ films. With both α-Ni(OH)$_2$ and β-Ni(OH)$_2$ films, cobalt lowered the charge and discharge voltages. The effect was more pronounced on the β-Ni(OH)$_2$ films.

Multiple composition films were prepared by depositing bilayer α-Ni(OH)$_2$ films. One layer comprised nickel hydroxide with about 10% coprecipitated cobalt. The other layer comprised nickel hydroxide with no cobalt additive. Bilayer films with cobalt in either the inner or outer layer were prepared with a total film thickness of 1 micron and an overall concentration of about 5% coprecipitated cobalt. For comparison, nickel hydroxide films without cobalt and nickel hydroxide films with a uniform concentration of about 10% cobalt were also prepared with a thickness of 1 micron. Bilayer films of β-Ni(OH)$_2$ were prepared by converting bilayer films of α-Ni(OH)$_2$ to β-Ni(OH)$_2$ by hydrothermal treatment. Analytical measurements confirmed that bilayer films were deposited. XPS was used to survey the atomic composition of surface layers of both single composition films and bilayer films. XPS of the surface of a single film with 10% coprecipitated cobalt showed 20 atomic percent nickel and 2 atomic percent cobalt as expected for the 10:1 ratio coprecipitated. A similar atomic ratio was found with a bilayer film with 10% coprecipitated cobalt in the outer layer. XPS of the outer surface of a bilayer film with 10% cobalt coprecipitated in the inner layer showed only 22 atomic percent nickel with no cobalt detected. Cobalt was detected by EDS measurements which probe below the surface and into both layers. Quantitatively, cobalt was shown to be present in the film at a level of about 5% by ICP analysis of the dissolved film as expected.

Discharge capacity results of cells employing the bilayer films are given in Table 1. Films were charged at 2 mA with 2 minutes of overcharge and then discharged at 2 mA. Discharge capacities are expressed as electrons per metal atom (Ni+Co) in bilayer nickel hydroxide films differing in cobalt additive content in comparison to results with uniform cobalt additive content and results with no additive. For both α-Ni(OH)$_2$ and β-Ni(OH)$_2$, bilayer films with cobalt in the inner layer provided a higher capacity than films with a uniform cobalt composition which in turn provided a higher capacity than films with cobalt only in the outer layer. Best results are shown with cobalt in the inner layer. Remarkably, this invention allows one to reduce the amount of expensive cobalt additive by a factor of two and simultaneously increase the discharge capacity.

TABLE 1

| Inner Film | Outer Film | % Co | Discharge Capacity e$^-$/(Ni + Co) |
|---|---|---|---|
| α-Ni(OH)$_2$ | (one layer film) | 0 | 1.18 |
| α-Ni$_{0.9}$Co$_{0.1}$(OH)$_2$ | (one layer film) | 10 | 1.20 |
| α-Ni(OH)$_2$ | α-Ni$_{0.9}$Co$_{0.1}$(OH)$_2$ | 5 | 0.79 |
| α-Ni$_{0.9}$Co$_{0.1}$(OH)$_2$ | α-Ni(OH)$_2$ | 5 | 1.26 |
| β-Ni(OH)$_2$ | (one layer film) | 0 | 0.53 |
| β-Ni$_{0.9}$Co$_{0.1}$(OH)$_2$ | (one layer film) | 10 | 0.73 |
| β-Ni(OH)$_2$ | β-Ni$_{0.9}$Co$_{0.1}$(OH)$_2$ | 5 | 0.47 |
| β-Ni$_{0.9}$Co$_{0.1}$(OH)$_2$ | β-Ni(OH)$_2$ | 5 | 0.80 |

The role of the redox potentials in this example can be shown by comparing discharge potentials of components of the bilayer films. The discharge potentials for charged films of α-Ni$_{0.9}$Co$_{0.1}$(OH)$_2$ and α-Ni(OH)$_2$ were 0.29 and 0.31 V vs. a Hg/HgO reference electrode, respectively, when discharged at the 2 mA rate. The corresponding discharge potentials for β-Ni$_{0.9}$Co$_{0.1}$(OH)$_2$ and β-Ni(OH)$_2$ films were 0.31 and 0.34 V, respectively. The differences in redox potentials will force layers without cobalt to be preferentially discharged before the discharge of layers with cobalt in bilayer films. This should result in a decrease in the discharge capacity of films with cobalt in the outer layer due to early discharge of the inner layer leading to electronic isolation of the outer layer with cobalt. This should also result in an increase in the discharge capacity of bilayer films with cobalt in the inner layer due to the preferential discharge of the outer layer first leading to less electronic isolation in the outer part of the film. Both of these effects are observed in Table 1.

EXAMPLE II

Bilayer Films With Manganese and Zinc Additives

A series of α-Ni(OH)$_2$ films were deposited onto inert Au foils (1.2×1.4 cm) from a 0.1M Ni nitrate solution with or without manganese and/or zinc nitrate. Films were deposited at 20 mA (6 mA/cm$^2$) for 100 seconds producing films about 1 micron thick. Bilayer films were deposited by deposition from one solution at 20 mA for 50 seconds followed by deposition from a second solution at 20 mA for 50 seconds. β-Ni(OH)$_2$ films were prepared by hydrothermal conversion of α-Ni(OH)$_2$ films. Electrochemical measurements were performed as in Example I.

Films were analyzed for Ni, Mn, and Zn content by atomic absorption (AA) measurements. A theoretical discharge capacity was obtained from the total nickel manganese and zinc content and the number of electrons per metal atom was calculated. (It is generally known that manganese and zinc do not participate in the charge-discharge process. However, this approach includes the contribution of manganese and zinc to the weight of the film and allows for direct comparison of the specific capacities of the active materials.)

Analytical measurements confirmed that bilayer films were deposited. XPS used to survey the atomic composition of surface layers showed 20 atomic percent nickel and 5 atomic percent zinc, but no manganese in films having inner layers with coprecipitated manganese and outer layers with coprecipitated zinc. ICP analysis showed manganese was present in the film as expected. Analysis of films before and after charge-discharge cycles showed that zinc was leached from the film during operation yielding considerable porosity to the outer layer of the film.

Discharge capacity results with the thick bilayer films are given in Table 2. Again, films were charged at 2 mA with 2 minutes of overcharge and then discharged at 2 mA. Discharge capacities are expressed as electrons per metal atom (Ni+Mn+Zn) in bilayer nickel hydroxide films differing in manganese and/or zinc additive content in comparison to results with uniform additive content, results with cobalt additive, and results with no additive. For both α-Ni(OH)$_2$ and β-Ni(OH)$_2$, bilayer films with manganese in the inner layer and zinc in the outer layer provided a remarkably high capacity film electrode. The capacity provided by a bilayer film with manganese and zinc additives according to this invention yielded a capacity which was not only higher than that of films with no additives, but even considerably greater than those with the expensive cobalt additive. It should be noted that this effect was not due to the combination of Mn and Zn alone, but required the multiple compositions spatially arranged as a bilayer.

TABLE 2

| Inner Film | Outer Film | % M | Discharge Capacity $e^-/(Ni + Mn + Zn)$ |
|---|---|---|---|
| $\alpha$- $Ni(OH)_2$ | (one layer film) | 0 | 1.18 |
| $\alpha$- $Ni_{0.9}Co_{0.1}(OH)_2$ | (one layer film) | 10 | 1.20 |
| $\alpha$- $Ni_{0.9}Mn_{0.10}(OH)_2$ | (one layer film) | 10 | 1.19 |
| $\alpha$- $Ni_{0.9}Mn_{0.05}Zn_{0.05}(OH)_2$ | (one layer film) | 10 | 0.93 |
| $\alpha$- $Ni_{0.9}Mn_{0.10}(OH)_2$ | $\alpha$-$Ni(OH)_2$ | 5 | 1.28 |
| $\alpha$- $Ni_{0.9}Mn_{0.10}(OH)_2$ | $\alpha$-$Ni_{0.9}Zn_{0.1}(OH)_2$ | 10 | 1.36 |
| $\beta$- $Ni(OH)_2$ | (one layer film) | 0 | 0.54 |
| $\beta$- $Ni_{0.9}Co_{0.1}(OH)_2$ | (one layer film) | 10 | 0.75 |
| $\beta$- $Ni_{0.9}Mn_{0.10}(OH)_2$ | (one layer film) | 10 | 0.69 |
| $\beta$- $Ni_{0.9}Mn_{0.05}Zn_{0.05}(OH)_2$ | (one layer film) | 10 | 0.70 |
| $\beta$- $Ni_{0.9}Mn_{0.10}(OH)_2$ | $\beta$-$Ni(OH)_2$ | 5 | 0.61 |
| $\beta$- $Ni_{0.9}Mn_{0.10}(OH)_2$ | $\beta$-$Ni_{0.9}Zn_{0.1}(OH)_2$ | 10 | 0.95 |

The role of the redox potentials in this example can be shown by comparing discharge potentials of components of the bilayer films. The discharge potentials for charged films of $\alpha$-$Ni_{0.9}Mn_{0.1}(OH)_2$ and $\alpha$-$Ni_{0.9}Zn_{0.1}(OH)_2$ were 0.31 and 0.38 V vs. a Hg/HgO reference electrode, respectively, when discharged at the 2 mA rate. The corresponding discharge potentials for $\beta$-$Ni_{0.9}Mn_{0.1}(OH)_2$ and $\beta$-$Ni_{0.9}Zn_{0.1}(OH)_2$ films were 0.33 and 0.41 V, respectively. The differences in redox potentials will force layers with zinc to be preferentially discharged before the discharge of layers with manganese in bilayer films. This should result in an increase in the discharge capacity of bilayer films with manganese in the inner layer due to the preferential discharge of the outer layer with zinc leading to less electronic isolation in the outer part of the film. This effect is observed in Table 2.

EXAMPLE III

Bilayer Films With Cobalt and Zinc Additives

A series of $\alpha$-$Ni(OH)_2$ films were deposited onto inert Au foils (1.2×1.4 cm) from a 0.1M Ni nitrate solution with or without cobalt and/or zinc nitrate. These films were deposited at 20 mA (6 mA/cm$^2$) for 100 seconds producing films about 1 micron thick. Bilayer films were deposited by deposition from one solution at 20 mA for 50 seconds followed by deposition from a second solution at 20 mA for 50 seconds. $\beta$-$Ni(OH)_2$ films were prepared by hydrothermal conversion of $\alpha$-$Ni(OH)_2$ films. Electrochemical measurements were performed as in Example I.

Films were analyzed for Ni, Co, and Zn content by atomic absorption measurements. A theoretical discharge capacity was obtained from the total nickel and cobalt content and the number of electrons transfered per metal atom was calculated. (It is generally known that cobalt and zinc do not participate in the charge-discharge process. However, this approach includes the contribution of cobalt and zinc to the weight of the film and allows for direct comparison of the specific capacities of the active materials.)

Discharge capacity results with the bilayer films are given in Table 3. Again, films were charged at 2 mA with 2 minutes of overcharge and then discharged at 2 mA. Discharge capacities are expressed as electrons per metal atom (Ni+Co+Zn) in bilayer nickel hydroxide films differing in cobalt and/or zinc additive content in comparison to results with uniform additive content, results with cobalt additive, and results with no additive. For both $\alpha$-$Ni(OH)_2$ and $\beta$-$Ni(OH)_2$, bilayer films with cobalt in the inner layer and zinc in the outer layer provided a remarkably high capacity film electrode. The capacity provided by a bilayer film with cobalt and zinc additives according to this invention yielded a capacity which was not only higher than that of films with no additives, but even considerably greater than those with only the expensive cobalt additive. It should be noted that this effect was not due to the combination of Co and Zn alone, but required the multiple compositions spatially arranged as a bilayer.

TABLE 3

| Inner Film | Outer Film | % M | Discharge Capacity $e^-/(Ni + Co + Zn)$ |
|---|---|---|---|
| $\alpha$-$Ni(OH)_2$ | (one layer film) | 0 | 1.18 |
| $\alpha$-$Ni_{0.9}Co_{0.1}(OH)_2$ | (one layer film) | 10 | 1.20 |
| $\alpha$-$Ni_{0.9}Co_{0.05}Zn_{0.05}(OH)_2$ | (one layer film) | 10 | 1.29 |
| $\alpha$-$Ni_{0.9}Co_{0.10}(OH)_2$ | $\alpha$-$Ni_{0.9}Zn_{0.1}(OH)_2$ | 10 | 1.33 |
| $\beta$-$Ni(OH)_2$ | (one layer film) | 0 | 0.54 |
| $\beta$-$Ni_{0.9}Co_{0.1}(OH)_2$ | (one layer film) | 10 | 0.75 |
| $\beta$-$Ni_{0.9}Co_{0.05}Zn_{0.05}(OH)_2$ | (one layer film) | 10 | 0.89 |
| $\beta$-$Ni_{0.9}Co_{0.10}(OH)_2$ | $\beta$-$Ni_{0.9}Zn_{0.1}(OH)_2$ | 10 | 1.03 |

The role of the redox potentials in this example can be shown by comparing discharge potentials of components of the bilayer films. The discharge potentials for charged films of $\alpha$-$Ni_{0.9}Co_{0.1}(OH)_2$ and $\alpha$-$Ni_{0.9}Zn_{0.1}(OH)_2$ were 0.29 and 0.38 V vs. a Hg/HgO reference electrode, respectively, when discharged at the 2 mA rate. The corresponding discharge potentials for $\beta$-$Ni_{0.9}Co_{0.1}(OH)_2$ and $\beta$-$Ni_{0.9}Zn_{0.1}(OH)_2$ films were 0.31 and 0.41 V, respectively. The differences in redox potentials will force layers with zinc to be preferentially discharged before the discharge of layers with cobalt in bilayer films. This should result in an increase in the discharge capacity of bilayer films with cobalt in the inner layer due to the preferential discharge of the outer layer with zinc leading to less electronic isolation in the outer part of the film. This effect is observed in Table 3.

EXAMPLE IV

Bilayer Films With Aluminum Additives

A series of $\alpha$-$Ni(OH)_2$ films were deposited onto inert Au foils (1.2×1.4 cm) from a 0.1M Ni nitrate solution with or without aluminum nitrate. The films were deposited at 20 mA (6 mA/cm$^2$) for 100 seconds which produced films about 1 micron thick. Bilayer films were deposited by deposition from one solution at 20 mA for 50 seconds followed by deposition from a second solution at 20 mA for 50 seconds. A series of $\beta$-$Ni(OH)_2$ films were prepared by hydrothermal conversion of $\alpha$-$Ni(OH)_2$ films. Electrochemical measurements were performed as in Example I.

Films were analyzed for Ni and Al content by inductively coupled plasma (ICP) spectrometry. A theoretical discharge capacity was obtained from the total nickel and aluminum content and the number of electrons per metal atom was calculated. (It is known that aluminum does not participate in the charge-discharge process. However, this approach includes the contribution of aluminum to the weight of the film and allows for direct comparison of the specific capacities of the active materials.)

Discharge capacity results with the bilayer films are given in Table 4. Again, films were charged at 2 mA with 2 minutes of overcharge and then discharged at 2 mA. Discharge capacities are expressed as electrons per metal atom (Ni+Al) in bilayer nickel hydroxide films differing in aluminum additive content in comparison to results with uniform additive content, results with cobalt additive, and results with no additive. For both $\alpha$-$Ni(OH)_2$ and $\beta$-$Ni(OH)_2$, bilayer films with no additive in the inner layer and aluminum in the outer layer provided an enhanced capacity. This effect was not due to the Al additive alone, but required the multiple compositions spatially arranged as a bilayer.

TABLE 4

| Inner Film | Outer Film | % M | Discharge Capacity $e^-/(Ni + Al)$ |
|---|---|---|---|
| $\alpha$-Ni(OH)$_2$ | (one layer film) | 0 | 1.18 |
| $\alpha$-Ni$_{0.9}$Co$_{0.1}$(OH)$_2$ | (one layer film) | 10 | 1.20 |
| $\alpha$-Ni$_{0.9}$Al$_{0.1}$(OH)$_2$ | (one layer film) | 10 | 0.18 |
| $\alpha$-Ni(OH)$_2$ | $\alpha$-Ni$_{0.9}$Al$_{0.1}$(OH)$_2$ | 5 | 1.10 |
| $\beta$-Ni(OH)$_2$ | (one layer film) | 0 | 0.54 |
| $\beta$-Ni$_{0.9}$Co$_{0.1}$(OH)$_2$ | (one layer film) | 10 | 0.75 |
| $\beta$-Ni$_{0.9}$Al$_{0.1}$(OH)$_2$ | (one layer film) | 10 | not stable |
| $\beta$-Ni(OH)$_2$ | $\beta$-Ni$_{0.9}$Al$_{0.1}$(OH)$_2$ | 10 | 0.74 |

The role of the redox potentials in this example can be shown by comparing discharge potentials of components of the bilayer films. The discharge potentials for charged films of $\alpha$-Ni(OH)$_2$ and $\alpha$-Ni$_{0.9}$Al$_{0.1}$(OH)$_2$ were 0.31 and 0.40 V vs. a Hg/HgO reference electrode, respectively, when discharged at the 2 mA rate. Presumably, aluminum also shifts the redox potential of anodic for $\beta$-Ni(OH)$_2$ films. The differences in redox potentials will force layers with aluminum to be preferentially discharged before the discharge of layers without aluminum in bilayer films. This should result in an increase in the discharge capacity of bilayer films with nickel hydroxide in the inner layer due to the preferential discharge of the outer layer with aluminum leading to less electronic isolation in the outer part of the film. This effect is observed in Table 4.

EXAMPLE V

Trilayer Films With Co, Mn, and Zn Additives

A series of $\alpha$-Ni(OH)$_2$ films were deposited onto inert Au foils (1.2×1.4 cm) from a 0.1M nickel nitrate solution with or without 10% cobalt, manganese, and/or zinc nitrate. Films were deposited at 20 mA (6 mA/cm$^2$) for 100 seconds producing films about 1 micron thick. Trilayer films were deposited by deposition from a 10% Co solution at 20 mA for 20 seconds followed by deposition from a 10% Mn solution at 20 mA for 40 seconds followed by deposition from a 10% Zn solution at 20 mA for 40 seconds.

A series of $\beta$-Ni(OH)$_2$ films were prepared by hydrothermal conversion of $\alpha$-Ni(OH)$_2$ films. Electrochemical measurements were performed as in Example I and films were analyzed for Ni and various metallic additives by ICP spectrometry. A theoretical discharge capacity was also obtained from the total nickel and metallic additive content and the number of electrons per metal atom was calculated.

Discharge capacity results with the trilayer films are given in Table 5. Films were charged at 2 mA with 2 minutes of overcharge and then discharged at 2 mA. Discharge capacities are expressed as electrons per metal atom (Ni+Co+Mn+Zn) in trilayer nickel hydroxide films differing in cobalt, manganese, and zinc additive content in comparison to results with uniform additive content, results with cobalt additive, and results with no additive. Trilayer films with Co in the inner layer, Mn in the intermediate layer, and Zn in the outer layer showed a remarkably high specific capacity for both alpha and beta phases. The capacity achieved with the current invention substantially exceeded that of spatially uniform electrodes with no additives, with cobalt additives, and with mixed Co—Mn—Zn additives.

TABLE 5

| Inner Film | Middle Film | Outer Film | % M | Discharge Capacity $e^-/Ni + Co + Zn)$ |
|---|---|---|---|---|
| $\alpha$-Ni(OH)$_2$ | (one layer film) | — | 0 | 1.18 |
| $\alpha$-Ni$_{0.9}$Co$_{0.1}$(OH)$_2$ | (one layer film) | — | 10 | 1.20 |
| $\alpha$-Ni$_{0.9}$Co$_{0.03}$Mn$_{0.03}$Zn$_{0.03}$(OH)$_2$ | (one layer film) | — | 10 | 1.22 |
| $\alpha$-Ni$_{0.9}$Co$_{0.1}$(OH)$_2$ | $\alpha$-Ni$_{0.9}$Mn$_{0.1}$(OH)$_2$ | $\alpha$-Ni$_{0.9}$Zn$_{0.1}$(OH)$_2$ | 10 | 1.38 |
| $\beta$-Ni(OH)$_2$ | (one layer film) | — | 0 | 0.54 |
| $\beta$-Ni$_{0.9}$Co$_{0.1}$(OH)$_2$ | (one layer film) | — | 10 | 0.75 |
| $\beta$-Ni$_{0.9}$Co$_{0.03}$Mn$_{0.03}$Zn$_{0.03}$(OH)$_2$ | (one layer film) | — | 10 | 0.95 |
| $\beta$-Ni$_{0.9}$Co$_{0.1}$(OH)$_2$ | $\beta$-Ni$_{0.9}$Mn$_{0.1}$(OH)$_2$ | $\beta$-Ni$_{0.9}$Zn$_{0.1}$(OH)$_2$ | 10 | 1.16 |

The role of the redox potentials in this example can be shown by comparing discharge potentials of components of the trilayer films. The discharge potentials for $\alpha$-Ni$_{0.9}$Co$_{0.1}$(OH)$_2$, $\alpha$-Ni$_{0.9}$Mn$_{0.1}$(OH)$_2$, and $\alpha$-Ni$_{0.9}$Zn$_{0.1}$(OH)$_2$ were 0.29, 0.31, and 0.38 V, respectively. The corresponding discharge potentials for $\beta$-Ni$_{0.9}$Co$_{0.1}$(OH)$_2$, $\beta$-Ni$_{0.9}$Mn$_{0.1}$(OH)$_2$, and $\beta$-Ni$_{0.9}$Zn$_{0.1}$(OH)$_2$ films were 0.31, 0.33, and 0.41 V, respectively. The differences in redox potentials will force layers with zinc to be preferentially discharged first before the discharge of layers with manganese which are in turn preferentially discharged first before layers with cobalt in the trilayer films. This should result in an increase in the discharge capacity of trilayer films due to the preferential sequential discharge of the outer layers leading to less electronic isolation in the outer part of the film. This effect is observed in Table 5.

EXAMPLE VI

Multicomposition Sintered Nickel Electrodes

Sintered nickel electrodes were prepared by loading nickel hydroxide materials into sintered nickel plaque with a thickness of 0.037 inches and with a porosity of 85%. The size of these electrodes was $\frac{9}{16} \times \frac{3}{4}$ inches. The sintered plaques were loaded sequentially with two nickel hydroxide compositions.

The first nickel hydroxide impregnation was done electrochemically by cathodic deposition from a 2.5M nickel nitrate with or without 10% Co or Mn. This solution was held at a pH of 0.5 to 2 and held at a temperature of 45° C. during loading at 60 mA/cm$^2$ for 45 minutes. A loading of 0.8 to 1 g/cc void was achieved.

The second nickel hydroxide impregnation was done chemically from a 2.5M nickel nitrate with or without 10%

Co or Zn. The pH of this solution was adjusted to 2. The solution temperature was adjusted to 45° C. After immersing in this solution for 1 hour, the electrode was dried at 60° C., and then nickel hydroxide was precipitated by immersion into caustic (30 w/o NaOH) at 70° C. for 30 minutes. The electrode was rinsed and dried and subjected to a second chemical impregnation procedure. An additional loading of 0.8 to 1 g/cc void was achieved from two chemical impregnations.

These electrodes were tested in flooded cells containing 10 ml of 30 w/o KOH electrolyte with no lithium additive. The counter electrodes were metal hydride electrodes spaced about 0.25 inch from either side of the working electrodes. In the first charge, the electrodes were charged to 200% of their capacity at the C/2 rate. They were then discharged at the C/2 rate to 1 V. On subsequent cycles, they were charged to 115% of the discharge capacity and discharged, both at the C/2 rate.

Three electrodes with no additives delivered an average of 1.05 electrons per nickel atom in the first 5 charge-discharge cycles. Four electrodes with 10% cobalt additives delivered an average of 1.16 electrons per metal atom (Ni+Co) in the first 5 charge-discharge cycles. Three electrodes of the present invention impregnated first with nickel hydroxide containing 10% Mn and then with nickel hydroxide containing 10% Zn delivered an average of 1.12 electrons per metal atom (Ni+Mn+Zn) in the first 5 charge-discharge cycles. This is a remarkable result in that it shows that the expensive cobalt additive can be completely replaced by inexpensive manganese and zinc additives with no significant sacrifice in capacity.

It should be noted that the solid solution nickel hydroxide materials of the present invention can preferably be disordered materials which have at least one structure selected from the group consisting of amorphous, microcrystalline, polycrystalline lacking long range compositional order, or any combination thereof. Also, while specific chemical modifiers are disclosed in the examples above, the modifiers can be selected from the group consisting of Al, Ba, Ca, Co, Cr, Cu, Fe, K, Li, Mg, Mn, Na, Sr, Cd, Ce, La, Pb, Y, Sc, Ag, Sn and Zn.

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

What is claimed is:

1. A high capacity, long cycle life positive electrode for use in an alkaline rechargeable electrochemical cell comprising:
   an electronically conductive substrate for conducting electricity through the electrode; and
   an electrochemically active nickel hydroxide material in electrical contact with said electronically conductive substrate, said electrochemically active nickel hydroxide material being composed of at least two different solid solution nickel hydroxide materials each having differing compositions;
   wherein the positioning of said at least two different solid solution nickel hydroxide materials and their relative compositions alter the redox potential or porosity of the materials thereby forcing discharge of the electrode in a stepwise fashion from the nickel hydroxide material removed from said conductive network or substrate, through any intermediate nickel hydroxide materials, to the nickel hydroxide material adjacent the conductive network or substrate.

2. The positive electrode of claim 1, wherein said at least two different solid solution nickel hydroxide materials are disposed in discrete layers of differing composition.

3. The positive electrode of claim 2, wherein said at least two different solid solution nickel hydroxide materials which are disposed in discrete layers are positioned within the electrode such that:
   a first of said at least two different solid solution nickel hydroxide materials is positioned predominantly adjacent said conductive substrate;
   a second of said at least two different solid solution nickel hydroxide materials, having a higher redox potential and/or porosity than said first nickel hydroxide material, is positioned predominantly adjacent said first nickel hydroxide material, yet removed from the conductive substrate; and
   each succeeding material of said at least two different solid solution nickel hydroxide materials, if any, has a higher redox potential and/or porosity than the preceding material and is positioned adjacent the preceding material, yet removed from all other preceding materials and the conductive substrate.

4. The positive electrode claimed in claim 3, wherein each of said at least two different solid solution nickel hydroxide materials contains all of the same elements as the others and yet each of the materials contain different percentages of these elements.

5. The positive electrode claimed in claim 3, wherein at least one of said at least two different solid solution nickel hydroxide materials contains at least one chemical modifier element not present in the other materials.

6. The positive electrode claimed in claim 3, wherein each of said at least two different solid solution nickel hydroxide materials contains at least one chemical modifier element not present in the other materials.

7. The positive electrode claimed in claim 5, wherein said at least one chemical modifier element is selected from the group consisting of Al, Ba, Ca, Co, Cr, Cu, Fe, K, Li, Mg, Mn, Na, Sr, Cd, Ce, La, Pb, Y, Sc, Ag, Sn and Zn.

8. The positive electrode claimed in claim 6, wherein said at least one chemical modifier element is selected from the group consisting of Al, Ba, Ca, Co, Cr, Cu, Fe, K, Li, Mg, Mn, Na, Sr, Cd, Ce, La, Pb, Y, Sc, Ag, Sn and Zn.

9. The positive electrode claimed in claim 6, wherein said first solid solution nickel hydroxide material includes 5–15 at. % Co as the chemical modifier element and said second solid solution nickel hydroxide material includes 0–15 at. % Zn as the chemical modifier element.

10. The positive electrode claimed in claim 6, wherein said first solid solution nickel hydroxide material includes 5–15 at. % Mn as the chemical modifier element and said second solid solution nickel hydroxide material includes 0–15 at. % Zn as the chemical modifier element.

11. The positive electrode claimed in claim 6, wherein said first solid solution nickel hydroxide material includes 5–15 at. % Co as the chemical modifier element, said second solid solution nickel hydroxide material includes 5–15 at. % Mn as the chemical modifier element and a third solid solution nickel hydroxide material includes 0–15 at. % Zn as the chemical modifier element.

12. The positive electrode claimed in claim 6, wherein said first solid solution nickel hydroxide material includes 5–15 at. % Co as the chemical modifier element and said second solid solution nickel hydroxide material includes 5–15 at. % Mn as the chemical modifier element.

13. The positive electrode claimed in claim 3, wherein said positive electrode is a thin-film electrode and said at least two different solid solution nickel hydroxide materials each having differing compositions are disposed in layers upon a substrate plate or foil.

14. The positive electrode claimed in claim 3, wherein said positive electrode is a sintered electrode and said at least two different solid solution nickel hydroxide materials each having differing compositions are disposed in layers upon a porous sintered substrate.

15. The positive electrode claimed in claim 3, wherein said positive electrode is a pasted electrode and said at least two different solid solution nickel hydroxide materials each having differing compositions are disposed in layered particles pasted into a conductive substrate foam or fiber matte.

16. The positive electrode claimed in claim 15, further including a conductive network disposed between and providing electrical interconnection of said layered particles and the conductive substrate foam or fiber matte.

17. The positive electrode claimed in claim 13, wherein said thin-film electrode comprises two different solid solution nickel hydroxide materials each having differing compositions which are disposed in layers upon a substrate foil.

18. The positive electrode claimed in claim 3, wherein the material adjacent the substrate comprises $Ni_{0.9}Co_{0.1}(OH)_2$ and the material removed from the substrate comprises $Ni(OH)_2$.

19. The positive electrode claimed in claim 3, wherein the material adjacent the substrate comprises $Ni_{0.9}Mn_{0.1}(OH)_2$ and the material removed from the substrate comprises $Ni(OH)_2$.

20. The positive electrode claimed in claim 3, wherein the material adjacent the substrate comprises $Ni_{0.9}Mn_{0.1}(OH)_2$ and the material removed from the substrate comprises $Ni_{0.9}Zn_{0.1}(OH)_2$.

21. The positive electrode claimed in claim 3, wherein the material adjacent the substrate comprises $Ni_{0.9}Co_{0.1}(OH)_2$ and the material removed from the substrate comprises $Ni_{0.9}Zn_{0.1}(OH)_2$.

22. The positive electrode claimed in claim 3, wherein the material adjacent the substrate comprises $Ni(OH)_2$ and the material removed from the substrate comprises $Ni_{0.9}Al_{0.1}(OH)_2$.

23. The positive electrode claimed in claim 9, wherein said thin-film electrode comprises three different solid solution nickel hydroxide materials each having differing compositions which are disposed in layers upon a substrate foil.

24. The positive electrode claimed in claim 3, wherein the material adjacent the substrate comprises $Ni_{0.9}Co_{0.1}(OH)_2$, the intermediate material comprises $Ni_{0.9}Mn_{0.1}(OH)_2$ and the material removed from the substrate comprises $Ni_{0.9}Zn_{0.1}(OH)_2$.

25. The positive electrode claimed in claim 1, wherein at least one of said at least two different solid solution nickel hydroxide materials is a disordered material and has at least one structure selected from the group consisting of amorphous, microcrystalline, polycrystalline lacking long range compositional order, or any combination thereof.

* * * * *